(12) United States Patent
Vreeman et al.

(10) Patent No.: US 8,242,411 B2
(45) Date of Patent: Aug. 14, 2012

(54) METHOD AND DEVICE FOR HOLDING TOGETHER AN ELECTRONICALLY NON-CONDUCTIVE STACK OF OBJECTS

(75) Inventors: Johan Hendrik Vreeman, Lochem (NL); Gerrit Hendrik Ten Tije, Diepenheim (NL)

(73) Assignee: Illinois Tool Works Inc., Glenview, IL (US)

( * ) Notice: Subject to any disclaimer, the term of this patent is extended or adjusted under 35 U.S.C. 154(b) by 1192 days.

(21) Appl. No.: 11/482,118

(22) Filed: Jul. 7, 2006

(65) Prior Publication Data

US 2007/0029297 A1 Feb. 8, 2007

(30) Foreign Application Priority Data

Jul. 7, 2005 (NL) ...................................... 1029461

(51) Int. Cl.
*B23K 11/00* (2006.01)
*B23K 11/06* (2006.01)
(52) U.S. Cl. ............ 219/148; 219/819; 219/82; 219/84; 219/79; 219/119
(58) Field of Classification Search .................. 219/148, 219/81, 82, 84, 79, 119, 106, 91.21; 361/225, 361/230, 233
See application file for complete search history.

(56) References Cited

U.S. PATENT DOCUMENTS

| | | | | |
|---|---|---|---|---|
| 2,014,226 A | * | 9/1935 | Catlett | 219/75 |
| 3,632,957 A | * | 1/1972 | Hannah | 219/119 |
| 4,009,362 A | * | 2/1977 | Becker | 219/92 |
| 4,234,779 A | * | 11/1980 | Willems | 219/121.36 |
| 5,122,629 A | * | 6/1992 | Stieger | 219/64 |
| 5,372,125 A | * | 12/1994 | Lyons | 600/396 |
| 5,655,188 A | * | 8/1997 | Nagamori et al. | 399/174 |
| 5,721,417 A | * | 2/1998 | Craig | 219/137.43 |
| 5,868,546 A | | 2/1999 | Hahne et al. | |
| 6,320,156 B1 | * | 11/2001 | Yamaguchi et al. | 219/121.5 |
| 6,748,855 B1 | * | 6/2004 | Hahne et al. | 100/70 R |
| 6,749,669 B1 | * | 6/2004 | Griffiths et al. | 96/67 |

FOREIGN PATENT DOCUMENTS

| | | | |
|---|---|---|---|
| DE | 3508514 A1 | | 9/1986 |
| DE | 10050451 A1 | | 4/2002 |
| EP | 0683034 A2 | | 11/1995 |
| EP | 683034 A2 | * | 11/1995 |
| EP | 683034 A2 | * | 11/1995 |
| EP | 1285875 A1 | * | 2/2003 |
| EP | 1285875 A1 | * | 2/2003 |
| EP | 1516838 A2 | | 3/2005 |
| JP | 57190784 A | * | 11/1982 |
| JP | 9-38772 A | * | 2/1997 |
| JP | 2000-183144 A | * | 6/2000 |

OTHER PUBLICATIONS

European Search Report issued Dec. 1, 2006 in corresponding foreign application.

* cited by examiner

*Primary Examiner* — Henry Yuen
*Assistant Examiner* — Ayub Maye
(74) *Attorney, Agent, or Firm* — Lowe Hauptman Ham & Berner LLP

(57) ABSTRACT

A method for holding together an electrically non-conductive stack of objects, such as a stack of magazines or foil strips includes forming the stack of objects; and applying to one side of the stack a static polarity with a planar, semi-conductive electrode.

17 Claims, 2 Drawing Sheets

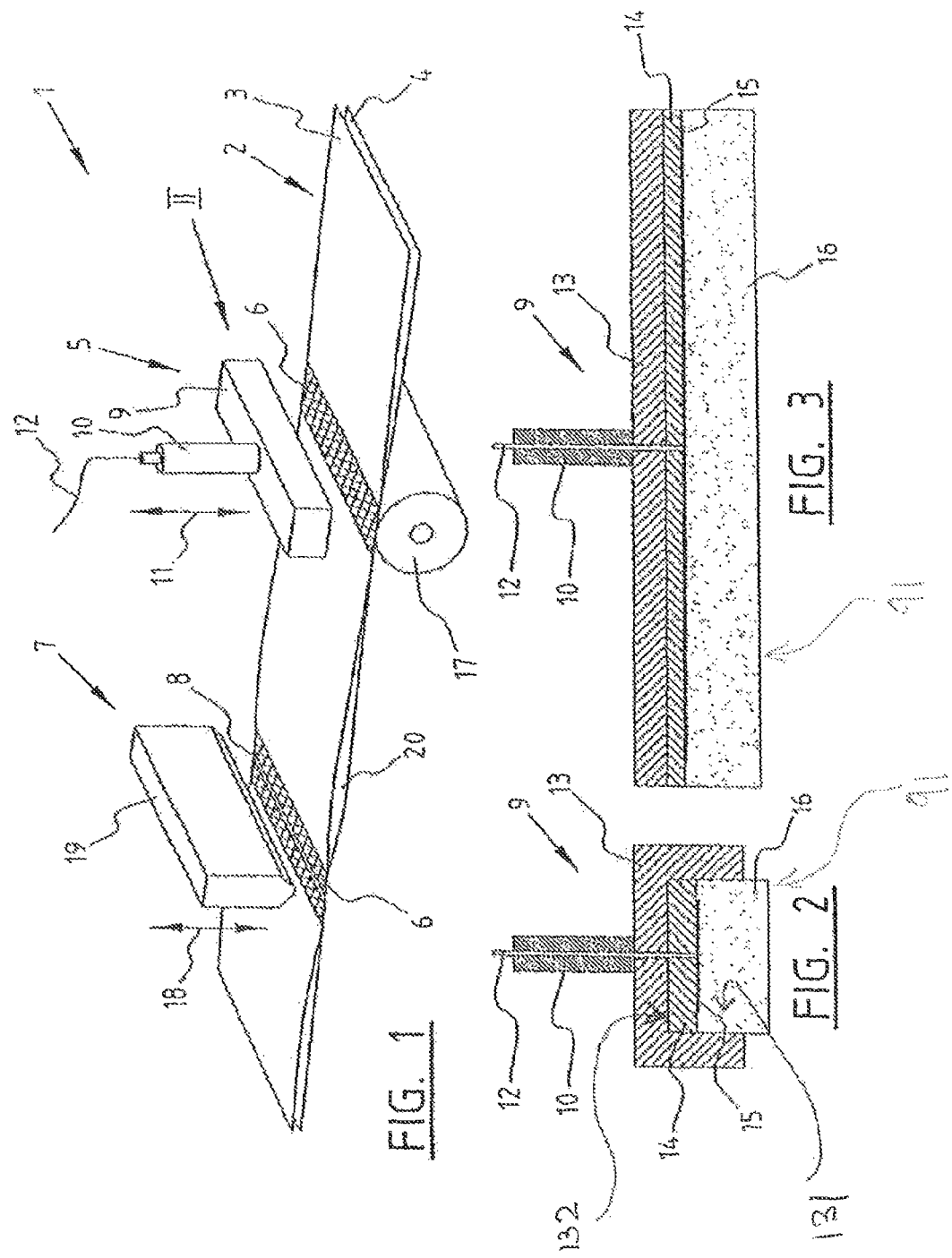

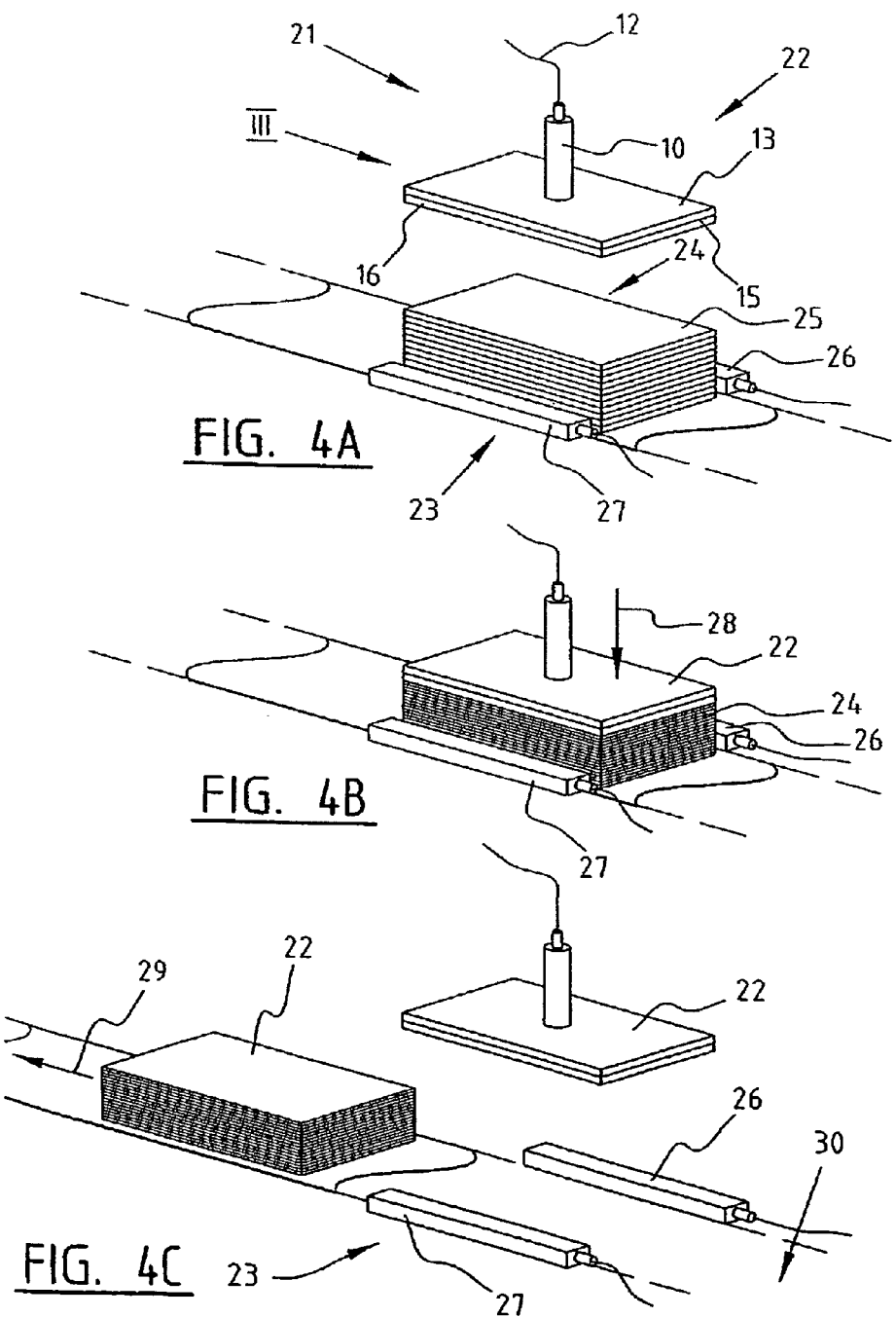

METHOD AND DEVICE FOR HOLDING TOGETHER AN ELECTRONICALLY NON-CONDUCTIVE STACK OF OBJECTS

RELATED APPLICATIONS

The present application is based on, and claims priority from, Dutch Application Number 1029461, filed Jul. 7, 2005, the disclosure of which is hereby incorporated by reference herein in its entirety.

TECHNICAL FIELD

The present invention relates to a method and to a device for holding together an electrically non-conductive stack of objects.

BACKGROUND OF THE INVENTION

Such a stack can for instance consist of a stack of magazines or a number of foil strips stacked on top of each other.

In the case of a stack of magazines, these are stacked at a placing location to a height which can vary from 5 to 50 cm. The stack must then be bundled for dispatch. During transport however, the magazines can begin to slide relative to each other as a result of the mechanical forces exerted thereon.

Stacked foil strips may for instance be intended for a device for manufacturing plastic bags. The stacked foils are placed in a welding station where the foil strips are welded to each other. It is important that a weld is applied at the correct position in the welding station, for instance for the side edges and at the position of an arranged handle with handle reinforcement.

For both the above stated cases use can be made of static electricity to hold together the stacked objects. After the static electricity has been applied an electric field is formed which ensures that the stacked objects are held together. This manner of stacking is however found to be insufficiently reliable. In the holding together of the stacked foil strips the drawback moreover occurs that foil strips are so firmly connected together that it is difficult or impossible to open the formed bag, this being particularly disadvantageous if the bag is filled automatically.

SUMMARY OF THE INVENTION

The present invention has for its object to obviate the above stated drawbacks, and is based on the insight that the above stated drawbacks are the result of an insufficiently accurate and homogenous application of the static electricity.

According to a first aspect, the invention therefore provides a method for holding together an electrically non-conductive stack of objects, such as a stack of magazines or foil strips, comprising of:

forming the stack of objects; and
applying to one side of the stack a static polarity with a planar, semi-conductive electrode.

By making use of a planar, semi-conductive electrode it is possible to realize static charging in defined manner (in respect of form and magnitude) on a determined contact surface. This defined static charging will result in a more homogenous electric field, and therefore better holding together of the objects in the stack at only those positions where adhesion is desired for the holding together.

It is important that the stack of objects is electrically non-conductive. Static charge can thus be applied. Such a stack of objects can include objects which are wholly non-conductive or non-conductive on one side. In addition, it is possible for one or more electrically non-conductive objects to be present on the top side and/or the bottom side.

The static polarity is preferably applied to a top surface, and a counter-polarity is applied at a distance to for instance a side surface or bottom surface. This counter-polarity can be the earthed polarity or a counter-polarity with a high direct voltage. The differential polarity is generally from 0 kV to 120 kV. The magnitude of the difference in polarity is determined by the type of objects to be held together and the height of the stack.

It has been found that a sufficiently adhesive electric field is generated by making use of a planar, semi-conductive electrode. In the case a counter-polarity is applied use can therefore be made of a known charging rod which is provided with sharp tips with which static electricity can be applied. A very good adhesion is obtained if the counter-polarity is likewise applied with a planar counter-electrode.

The planar electrode is given a form substantially corresponding with the counter-surface of the stack. The electrode can be flat and/or shaped. In the latter case for instance with a form corresponding with a cylinder surface such as when the stack of objects is guided as a length over a roller, or the electrode is embodied in the form of a roller.

If in further preference the planar electrode is elastically deformable, the advantage is achieved that a better contact occurs between the surface of the stack on the one hand and the planar electrode on the other, whereby static charge is transferred in more homogenous and more defined manner. The objects in the stack will moreover hardly be damaged, or not at all. Finally, there is increased safety in the case of direct contact and less danger of sparking.

Another aspect of the present invention relates to a device for holding together an electrically non-conductive stack of objects, such as a stack of magazines and foil strips, comprising a placing location for the stack of objects and at least one planar, elastically deformable semi-conductive electrode for applying a static polarity to a surface of the stack.

As stated above, it is advantageous if the device is also provided with a counter-electrode for applying a counter-polarity or for instance a virtual earth. The counter-electrode can be a bottom of the device and be formed for instance by a part of a conveyor belt. According to another embodiment, the counter-electrode can be formed by a roller over which the stacked objects, for instance the stack of foil strips, is supported and guided. If an earth polarity is applied as counter-polarity, it is recommended that the bottom or the roller is earthed.

Particularly in the case the stacked objects are transported at high speed it is recommended that the planar electrode performs a reciprocating, i.e. up and downward, movement relative to the stack which must be electrostatically charged.

As stated above, it is further recommended that the planar electrode is elastically deformable.

According to a preferred embodiment, it is further recommended that the device is also provided with a welding device for welding the stacked objects, since in this manner precisely defined welds can be arranged on only the part of the mutually stacked objects with static charge.

BRIEF DESCRIPTION OF THE DRAWINGS

Mentioned and other features of the method and device according to the invention will be further elucidated hereinbelow on the basis of two exemplary embodiments, to which the device is not deemed limited but which are given only by way of example. Reference is made here to the accompanying drawings, in which:

FIG. 1 shows a perspective view of a first device according to the invention for static charging and welding of stacked foil strips;

FIGS. 2 and 3 show respective cross-sections of detail II of FIG. 1 and detail III of FIG. 4, i.e. the planar, elastically deformable semi-conductive electrode; and FIGS. 4A, 4B and 4C show another device according to the invention for holding together a stack of magazines during the different steps of the method according to the invention.

DETAILED DESCRIPTION OF THE PREFERRED EMBODIMENTS

FIG. 1 shows a device 1 according to the invention for holding together a stack 2 of electrically non-conductive foil strips 3 and 4, for instance manufactured from polyethylene. Device 1 comprises a station 5 for applying a static polarity to stack 2 at a precisely determined part 6 of stack 2. Device 1 further comprises a welding station 7 for arranging a weld 8 in the part 6 of stack 2 of foil strips 3 and 4 that is mutually adhered by static electricity.

Station 5 comprises a planar, semi-conductive electrode 9. Electrode 9 is connected via a rod 10 to a reciprocating unit, whereby the movement is performed as according to double arrow 11. Depending on the relative differences in speed, electrode 9 can also or only perform a translating movement along and in the direction of transport. Via rod 10 the electrode 9 is connected via a cable 12 to a source of static electricity.

The construction of planar electrode 9 is shown in FIGS. 2 and 3. Electrode 9 comprises a holder 13 in which is accommodated a non-conductive support 14 on which is arranged a conducting metal foil, for instance an aluminum foil 15 (with for instance a specific resistance of <1000 ohm), and then a resilient layer of semi-conductive material 16. The non-conductive support 14 can for instance be manufactured from a plastic. The aluminum foil layer 15 is intended as conductor for the static electricity and is connected via cable 12 to the static electricity source. It is thus possible to apply a planar static polarity over a defined surface (of non-conductive support 14). As best seen in FIG. 3, the holder 13 defines a cavity 131 having a bottom 132 on which non-conductive support 14 is arranged. The layer 15 is received in the cavity 131 and is sandwiched between the holder 13 (or support 14) and the layer of semi-conductive material 16 as best seen in FIG. 2. As also best seen in FIG. 2, the layer of semi-conductive material projects from within the cavity 131 to an outside of the cavity 131 to define the outermost surface 91 of the planar electrode 9. As best seen in FIGS. 2 and 3, the layer 15 is covered by the layer of semi-conductive material 16 and does not come into direct contact with the stack 2 when the semi-conductive material 16 is in direct contact with the stack 2.

The semi-conductive, elastically resilient material has a specific resistance of $10^3$-$10^{12}$ ohm.

By pressing electrode 9 onto stack 2 of foil strips 3 and 4 static electricity is as it were transferred in the manner of a stamp with the form of part 6 in FIG. 1. It will be apparent to the skilled person that arranging of the conductive layer 15 in a specific pattern will result in this pattern being transferred in the manner of a stamp.

The semi-conductive, elastically resilient layer will deform upon contact with stack 2, whereby an intimate contact and transfer of static electricity becomes possible. When contact between the stack and electrode 9 is ended, layer 16 will spring back to its original form. A semi-conductive material is for instance formed by impregnated or doped polyurethane foam.

Other suitable semi-conductive layers 16 (which are optionally elastically resilient) comprise resins, woven materials, non-wovens of fibres, for instance polymer fibres.

FIG. 1 furthermore shows that electrode 9 co-acts with a counter-roller 17 which can be earthed or provided with a counter-polarity, this depending on the requirements set for the difference in polarity for the purpose of holding together the two foil strips.

Disposed reciprocally as according to double arrow 18 in welding station 7 is a welding member 19 which makes the welded connection 8 at precisely the correct location in the electrostatically charged part 6. Between two parts 6 the two foil strips 3 and 4 will in each case not be held together by static electricity, whereby a space 20 occurs between the two foil strips.

Stack 2 can be transported at very high speed, although by making use of the rapid reciprocating movements relative to both electrode 9 and welding member 19 it nevertheless becomes possible to arrange a weld at exactly the correct defined position in the foil strips held together electrostatically.

FIG. 4 shows another device 21 according to the invention. Device 21 comprises electrode 22 of the same construction as electrode 9 of device 1 of FIG. 1. This is shown in more detail in FIG. 3 (detail III in FIG. 4A).

Device 21 further comprises a placing location 23 where a stack 24 of objects 25, for instance magazines, is formed. Electrode 22 is then pivoted to a position above the stack and two charging rods are positioned laterally. As shown in FIG. 4B, electrode 22 is displaced as according to arrow 28 towards stack 24 and compresses it. Static electricity is applied via electrode 22 and a counter-polarity via the two charging rods 26 and 27. After applying the static electricity electrode 22 is displaced upward, whereafter stack 22 held together by static electricity is displaced in the direction of arrow 29, whereafter placing station 23 is left clear for a new stacking operation.

It will be apparent to the skilled person that the two charging rods 26 and 27 can be embodied as a planar, optionally resilient semi-conductive electrode according to the invention. In another case as shown in FIG. 4C, it is possible to make use of a conductive bottom of transport system 30 of device 21 which, if necessary, can be earthed in order to apply the counter-polarity.

Other applications of the method and invention according to the invention comprise for instance of holding together shrink foils for a shrink tunnel of a packing machine, connecting the free end of a wound length of plastic, such as for bags, and the fly-over and contacting of a foil strip of a finished wound length of foil to an empty winding core.

The invention claimed is:
1. Method of holding together electrically non-conductive objects, comprising:
   forming a stack of the electrically non-conductive objects; and
   applying to a side of the stack a static polarity with a planar electrode to electrostatically holding the objects together;
   wherein the planar electrode comprises
      a conductive layer, and
      a layer of semi-conductive material that covers the conductive layer and defines an outermost surface of the planar electrode; and wherein said applying comprises:
- connecting the conductive layer to a static electricity source, and
- directly contacting the semi-conductive material with said side of the stack to apply static electricity from the static electricity source, via the conductive layer to the semi-conductive material, and then to said side of the stack;

wherein
the semi-conductive material is elastically deformable,
the semi-conductive material deforms upon direct contact with said side of the stack to ensure close contact and homogeneous transfer of the static electricity to the electrically non-conductive objects in the stack,
the semi-conductive material springs back to an original form thereof when the direct contact between the stack and the semi-conductive material is ended, and
said conductive layer is free of direct contact with the stack of objects when the semi-conductive material is in direct contact with said side of the stack.

2. Method as claimed in claim 1, wherein
the semi-conductive material has a specific resistance of $10^3$–$10^{12}$ ohm.

3. Method as claimed in claim 2, wherein
the semi-conductive material is impregnated or doped polyurethane foam.

4. Method as claimed in claim 1, further comprising
reciprocating the electrode toward and away from the stack of objects, while said stack is being continuously transferred along a transfer path, to apply the static electricity to said stack at a plurality of locations intermittently arranged along said path, to thereby electrostatically holding the objects together at said locations while leaving spaces among said objects in regions between adjacent said locations.

5. Method as claimed in claim 4, further comprising
welding the objects together at said locations where the objects have been electrostatically held together.

6. Device for holding together an electrically non-conductive stack of objects, said device comprising
a placing location for the stack of objects; and
at least one planar electrode for applying a static polarity to a surface of the stack;
wherein the planar electrode includes:
- a conductive layer for electrical connection to a static electricity source, and
- a layer of semi-conductive material that covers the conductive layer and defines an outermost surface of the planar electrode for directly contacting the surface of the stack and transferring static electricity from the static electricity source, via the conductive layer to the semi-conductive material, and then to said surface of the stack;

wherein
the semi-conductive material is elastically deformable,
the semi-conductive material is configured to deform upon direct contact with said surface of the stack to ensure close contact and homogeneous transfer of the static electricity to the electrically non-conductive objects in the stack,
the semi-conductive material is configured to spring back to an original form thereof when the direct contact between the stack and the semi-conductive material is ended, and
said conductive layer is configured to be free of direct contact with the stack of objects when the semi-conductive material is in direct contact with said surface of the stack.

7. Device as claimed in claim 6, further comprising a conveyor belt for transferring the stacked objects from a station at the placing location where the objects are to be placed in a stack to a static electricity application location under the electrode.

8. Device as claimed in claim 7, further comprising a counter-electrode, which comprises a roller disposed below the conveyor belt and opposite the electrode, for applying a counter-polarity to a bottom surface of the stack.

9. Device as claimed in claim 7, further comprising a pair of counter-electrodes disposed on opposite sides of the belt for contacting and applying a counter-polarity to lower portions of side surfaces of the stack.

10. Device as claimed in claim 7, wherein the planar electrode is moveable toward and away from a transfer path of the conveyor belt for contacting and applying static electricity to a top surface of the stack of objects.

11. Device as claimed in claim 7, further comprising a welding device positioned adjacent the conveyor belt downstream of the electrode for welding the stacked objects in portions the stacked objects are held together by static electricity applied by the electrode.

12. Device as claimed in claim 10, wherein the planar electrode is further moveable along the transfer path of the conveyor belt.

13. Device as claimed in claim 7, wherein the conveyor belt is grounded to define a counter-electrode for applying a counter-polarity to a bottom surface of the stack.

14. Device as claimed in claim 6, wherein the semi-conductive material has a specific resistance of $10^3$–$10^{12}$ ohm.

15. Device as claimed in claim 14, wherein the semi-conductive material is impregnated or doped polyurethane foam.

16. Device as claimed in claim 14, wherein the semi-conductive material is one selected from the group consisting of woven materials, and non-wovens of fibers.

17. Device as claimed in claim 6, wherein the semi-conductive material has a specific resistance of greater than $10^{10}$ and lower than $10^{12}$ ohm.

* * * * *